G. W. CRIST.
ICE CREAM CONTAINER.
APPLICATION FILED MAR. 19, 1912.
1,041,033.
Patented Oct. 15, 1912.
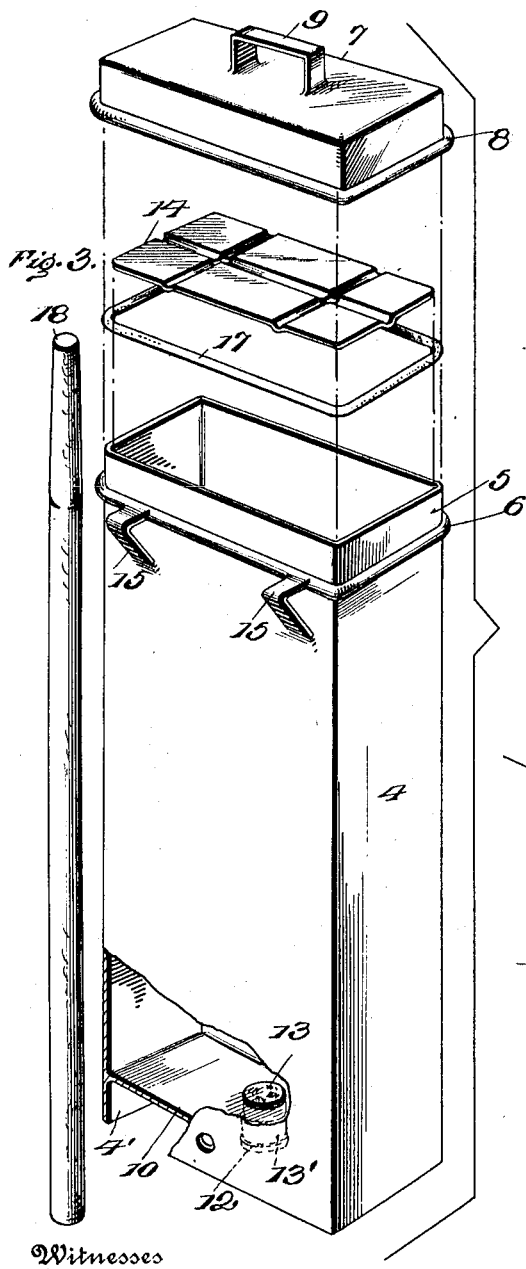
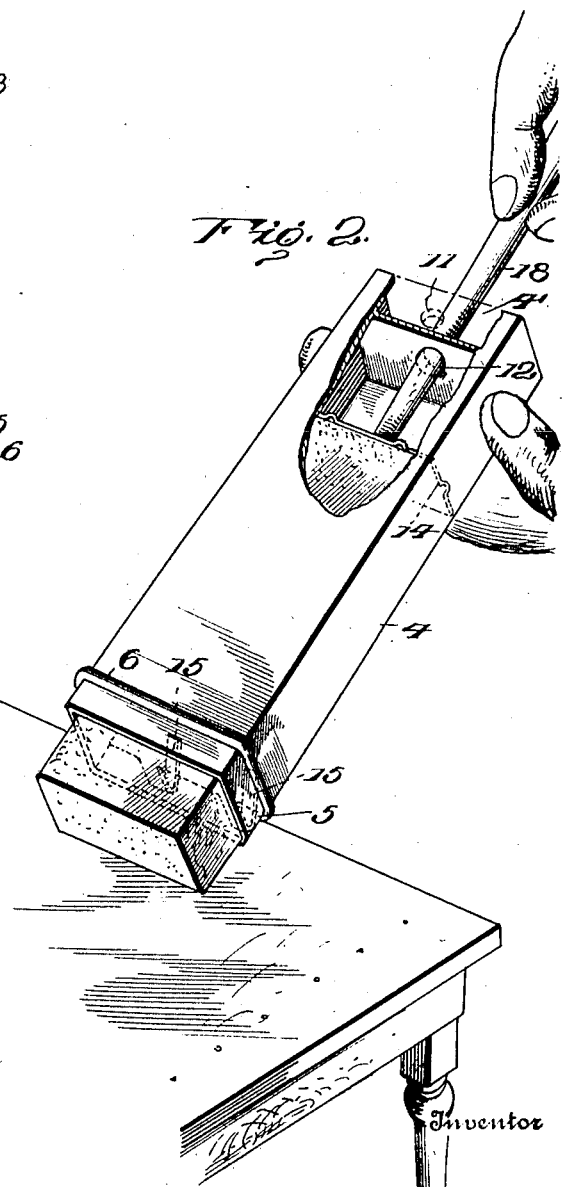

UNITED STATES PATENT OFFICE.

GEORGE W. CRIST, OF OSKALOOSA, IOWA.

ICE-CREAM CONTAINER.

1,041,033.  Specification of Letters Patent.  Patented Oct. 15, 1912.

Application filed March 19, 1912. Serial No. 684,741.

*To all whom it may concern:*

Be it known that I, GEORGE W. CRIST, a citizen of the United States, residing at Oskaloosa, in the county of Mahaska and State of Iowa, have invented certain new and useful Improvements in Ice-Cream Containers, of which the following is a specification.

My invention is directed to an improvement in ice cream molds or cans, and more particularly to molds or cans having straight sides and a cover at the top from which it is, in the ordinary form of such mold or can, impossible to turn out the frozen block without either breaking the block or heating the container, and consequently melting the outside of the block.

The object of my invention is the construction of a mold in which the cream to be frozen or packed will be prevented from contamination by the salt contained in the freezing medium, and from which the block of cream can be readily discharged.

To these ends my invention consists of the construction hereinafter fully described in connection with the accompanying drawings, wherein I show the preferred form of my invention and wherein the same part is designated by the same reference numeral wherever it occurs.

Referring to the drawings Figure 1 is a perspective, partly broken, view showing a mold or can, a cover therefor, and a false bottom adapted to be inserted within the mold, the said parts being shown in separated relation. Fig. 2 is a perspective view illustrating the manner of discharging the frozen block of cream from the mold and Fig. 3 is a view in elevation of the implement employed to discharge such block.

4 designates the mold or can and is provided at its upper end with a neck 5 on the base of which is formed a head 6 extending around the body portion 4.

7 designates a cover adapted to seat upon the neck 5, and is provided at its base with a head 8 adapted to rest upon the head 6 when the cover is in place. The cover is also provided with a handle 9 of the usual form.

Arranged above the lower end of the container 4 is secured a fixed bottom 10, whereby a depending flange 4' is formed which extends below the bottom 10. The bottom is provided with a central perforation 11 having a depending collar 12 adapted to receive a cork 13 to close the same. The length of the collar 12 is less than the depth of the flange 4', and the collar may be provided with a screw thread to receive a cap 13' to hold the cork firmly in position.

14 designates a false bottom, or follower, adapted to be placed within the container and rest upon the fixed bottom 10 thereof.

15, 15 are extensions or lugs formed adjacent the upper end of the body 4 of the mold, the upper portions of which extend outwardly and form stops or abutments adapted to abut against the edge of the table or other surface upon which it is desired to deliver the frozen block of cream, as illustrated in Fig. 2.

15 is the implement, preferably in the form of a stick or rod, the end of which is adapted to enter the opening 12 in the fixed bottom 10, when the cork 13 has been removed and by means of which pressure can be exerted against the lower face of the false bottom 14 to discharge the block of cream from the mold.

If found necessary a rubber gasket or ring 16 may be placed about the neck 5, thereby effecting a tight joint between said neck and the cover 7 fitting thereover. The bottom flange 4' may also be provided with one or more perforations 17 to prevent air from being trapped when the container is placed in a freezing mixture.

In the operation of my device a cork is placed in the orifice in the bottom of the container and the false bottom 14 placed in position in the container and the liquid to be frozen poured therein. The cover is then placed on the container, which can then be placed in a freezing medium. When it is desired to remove the frozen contents of the container the same is removed from the freezing mixture and the cover removed therefrom. The container is then placed with its lugs 15 resting against the edge of a table and the rod 16 inserted in the opening at the bottom thereof and its end pressed against the lower surface of the false bottom 14. Since air is free to enter beneath the false bottom the frozen block is free to be forced out without difficulty and without the necessity of heating up the container as is the usual practice with the ordinary form of container where it is desired to remove the contents in a single block.

Having thus described my invention what I claim as new and desire to secure by Letters Patent is:

1. In a container, the combination with a body portion having a fixed bottom therein provided with an aperture therethrough, of a false bottom adapted to rest upon said fixed bottom, means for exerting pressure upon said false bottom through the aperture in said fixed bottom, and means adjacent the upper end of the mold adapted to take against an abutment, for the purpose set forth.

2. In a container, the combination with a body portion having a fixed bottom therein provided with an aperture therethrough, a flange extending from said body portion below said fixed bottom, a false bottom adapted to rest upon said fixed bottom, an aperture in said fixed bottom, means for closing said aperture and means for exerting pressure through said aperture when such closing means is removed therefrom and against said false bottom.

In testimony whereof I affix my signature in presence of two witnesses.

GEORGE W. CRIST.

Witnesses:
CHRISTINE A. KEATING,
CHARLOTTE KEATING.